(12) United States Patent
Harada et al.

(10) Patent No.: US 11,719,126 B2
(45) Date of Patent: Aug. 8, 2023

(54) THRUST FOIL BEARING, FOIL BEARING UNIT, TURBO MACHINE, AND FOIL

(71) Applicant: NTN Corporation, Osaka (JP)

(72) Inventors: Kazuyoshi Harada, Mie (JP); Masato Yoshino, Mie (JP); Miki Okamoto, Mie (JP)

(73) Assignee: NTN CORPORATION, Osaka (JP)

( * ) Notice: Subject to any disclaimer, the term of this patent is extended or adjusted under 35 U.S.C. 154(b) by 169 days.

(21) Appl. No.: 17/434,804

(22) PCT Filed: Feb. 26, 2020

(86) PCT No.: PCT/JP2020/007769
§ 371 (c)(1),
(2) Date: Aug. 30, 2021

(87) PCT Pub. No.: WO2020/195488
PCT Pub. Date: Oct. 1, 2020

(65) Prior Publication Data
US 2022/0162965 A1     May 26, 2022

(30) Foreign Application Priority Data
Mar. 26, 2019   (JP) ................ 2019-059053

(51) Int. Cl.
*F01D 25/16*     (2006.01)
*F02C 6/12*     (2006.01)
*F16C 17/04*     (2006.01)

(52) U.S. Cl.
CPC ............. *F01D 25/168* (2013.01); *F02C 6/12* (2013.01); *F16C 17/042* (2013.01);
(Continued)

(58) Field of Classification Search
CPC .......... F01D 25/168; F01D 25/22; F02C 6/12; F16C 17/042; F16C 2360/24;
(Continued)

(56) References Cited

U.S. PATENT DOCUMENTS 5,918,985 A    7/1999   Bosley
RE38,373 E    12/2003   Bosley
(Continued)

FOREIGN PATENT DOCUMENTS

JP     11-148512     6/1999
JP     2004-108485     4/2004
(Continued)

OTHER PUBLICATIONS

International Preliminary Report on Patentability and Written Opinion of the International Searching Authority dated Sep. 28, 2021 in International (PCT) Application No. PCT/JP2020/007769.
(Continued)

*Primary Examiner* — Mickey H France
*Assistant Examiner* — Edward Bushard
(74) *Attorney, Agent, or Firm* — Wenderoth, Lind & Ponack, L.L.P.

(57) ABSTRACT

Each of foils (22) includes: a top foil portion (22a) including a bearing surface (S); and a back foil portion (22b), which is formed on an upstream side of the top foil portion (22a), and is arranged so as to overlap behind the top foil portion (22a) of the adjacent foil (22) (on a side opposite to the bearing surface (S)). An angle (E) covering a radially inner end of an overlapping portion (P) between the adjacent foils (22) is smaller than an angle (D) covering a radially outer end of the overlapping portion (P).

6 Claims, 9 Drawing Sheets

(52) U.S. Cl.
CPC ...... *F05D 2220/40* (2013.01); *F05D 2240/52* (2013.01); *F16C 2360/24* (2013.01)

(58) Field of Classification Search
CPC ............. F16C 2360/23; F05D 2220/40; F05D 2240/52; F05D 2240/53; F04D 29/057
See application file for complete search history.

(56) References Cited

U.S. PATENT DOCUMENTS

2014/0169707 A1* 6/2014 Yoshino .................. F16C 17/10
                                                                            384/105
2016/0356310 A1* 12/2016 Yoshino ................ F16C 17/024

FOREIGN PATENT DOCUMENTS

| | | |
|---|---|---|
| JP | 2013-61024 | 4/2013 |
| JP | 2015-132309 | 7/2015 |
| JP | 2016-80119 | 5/2016 |
| JP | 2017-180684 | 10/2017 |
| WO | 2017/169842 | 10/2017 |

OTHER PUBLICATIONS

International Search Report dated Apr. 21, 2020 in International (PCT) Application No. PCT/JP2020/007769.

\* cited by examiner

(COMPARATIVE EXAMPLE) A=B

FIG. 14

(EXAMPLE 1) A−B=5°

FIG. 15

(EXAMPLE 2) A−B=10°

THRUST FOIL BEARING, FOIL BEARING UNIT, TURBO MACHINE, AND FOIL

TECHNICAL FIELD

The present invention relates to a thrust foil bearing.

BACKGROUND ART

A bearing configured to support a main shaft of a turbo machine, such as a gas turbine or a turbocharger, is required to endure severe environments involving high temperature and high speed rotation. Focus has been given on a foil bearing being one kind of a fluid dynamic bearing as a bearing suitable for use under such conditions. The foil bearing includes bearing surfaces formed of flexible thin films (foils) having low flexural rigidity, and is configured to bear a load by allowing the bearing surfaces to be bent (for example, see Patent Literatures 1 and 2 described below).

CITATION LIST

Patent Literature 1: JP 2004-108485 A
Patent Literature 2: JP 2015-132309 A

SUMMARY OF INVENTION

Technical Problem

Lubricants to be used in the foil bearing is gas (air), and hence the foil bearing has an advantage of having lower torque than that of a fluid dynamic bearing that uses oil as the lubricants. However, a load capacity of the fluid dynamic bearing depends on a viscosity of the lubricants. Thus, the foil bearing that uses gas as the lubricants inevitably has a smaller load capacity than that of the fluid dynamic bearing that uses oil as the lubricants. Accordingly, in order to expand a field of application of the foil bearing, it is required to further increase the load capacity.

Figure 16:
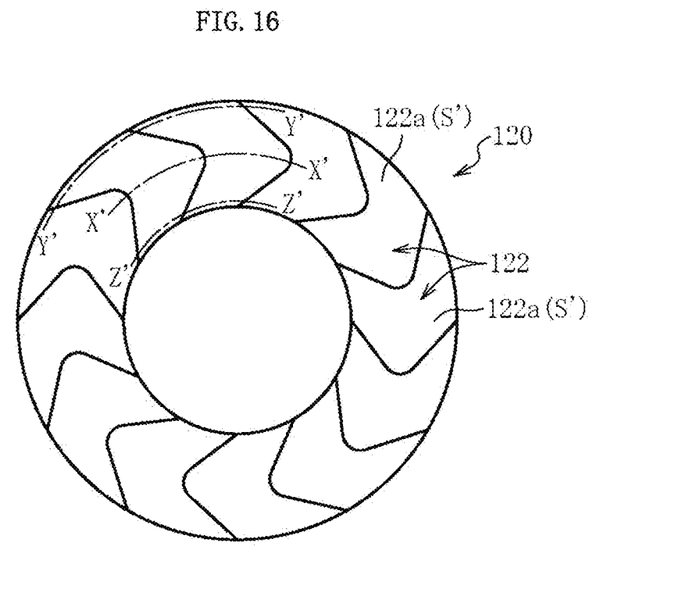
FIG. 16 is a front view for illustrating a related-art thrust foil bearing.
Figure 17:
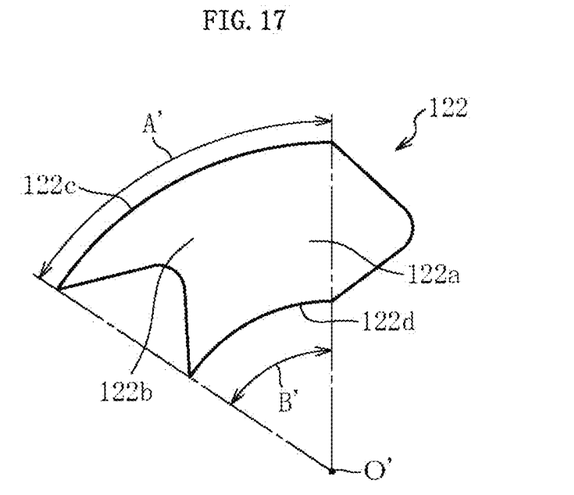
FIG. 17 is a front view for illustrating a foil of the thrust foil bearing of FIG. 16.
Figure 18:
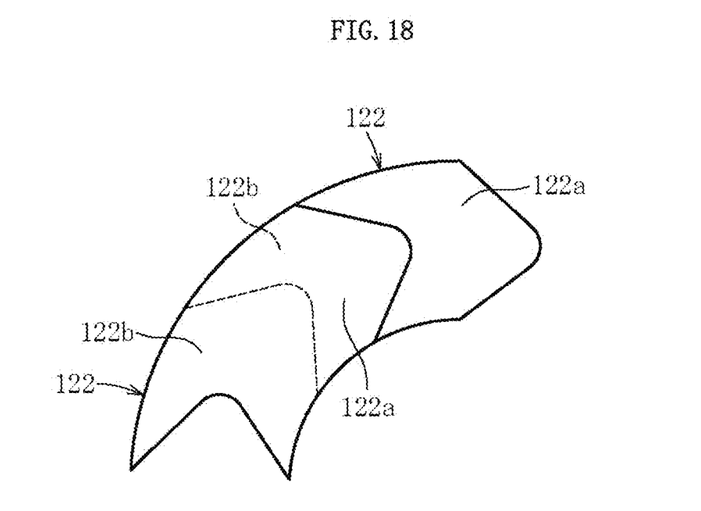
FIG. 18 is a front view for illustrating an overlapping state of the foils of FIG. 17.

Here, FIG. 16 is an illustration of a related-art thrust foil bearing 120 of a leaf type. In the thrust foil bearing 120, foils 122 each having a shape as illustrated in FIG. 17 are arranged so as to overlap each other with phases of the foils 122 being shifted as illustrated in FIG. 18. Of each of the foils 122, a portion arranged behind the adjacent foil 122 (on a side opposite to the bearing surface) functions as a back foil portion 122b, and a portion overlaying on the adjacent foil 122 functions as a top foil portion 122a comprising the bearing surface.

Figure 19:
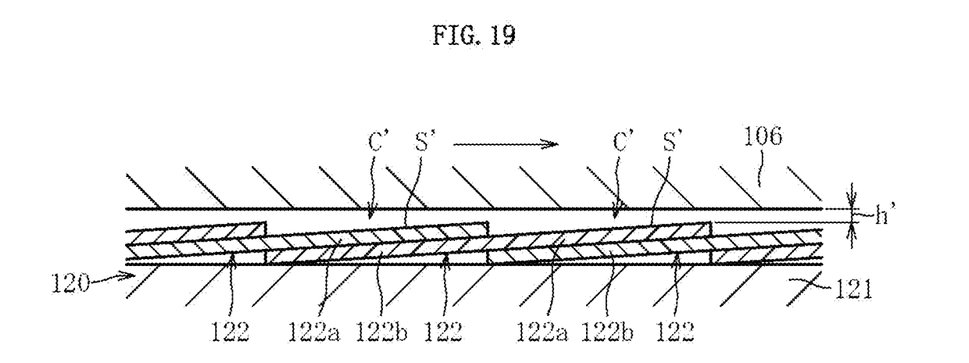
FIG. 19 is a sectional view taken along the line X'-X' of FIG. 16.

When a thrust collar 106 provided on a main shaft rotates in the direction indicated by the arrow of FIG. 19, a bearing gap C' is defined between a bearing surface S' formed on each of the foils 122 and an end surface of the thrust collar 106. At this time, the top foil portion 122a of each of the foils 122 overlays on the back foil portion 122b of the adjacent foil 122 so that the bearing gap C' between the top foil portion 122a of each of the foils 122 and the thrust collar 106 forms a wedge shape having a gap width that becomes gradually narrower toward a downstream side. When the lubricants (air) are pushed into a small gap portion of the wedge-shaped bearing gap C', the pressure of the lubricants are increased. With this pressure, the thrust collar 106 is supported in a non-contact manner.

A load capacity of the thrust foil bearing 120 as described above depends on a minimum width (hereinafter, the width is referred to as "floating gap") h' of the bearing gap C'. That is, in theory, as the floating gap h' becomes smaller, the load capacity of the thrust foil bearing 120 is increased. Therefore, in order to increase the load capacity of the thrust foil bearing 120, it is only required that the floating gap h' be reduced as much as possible.

Figure 20:
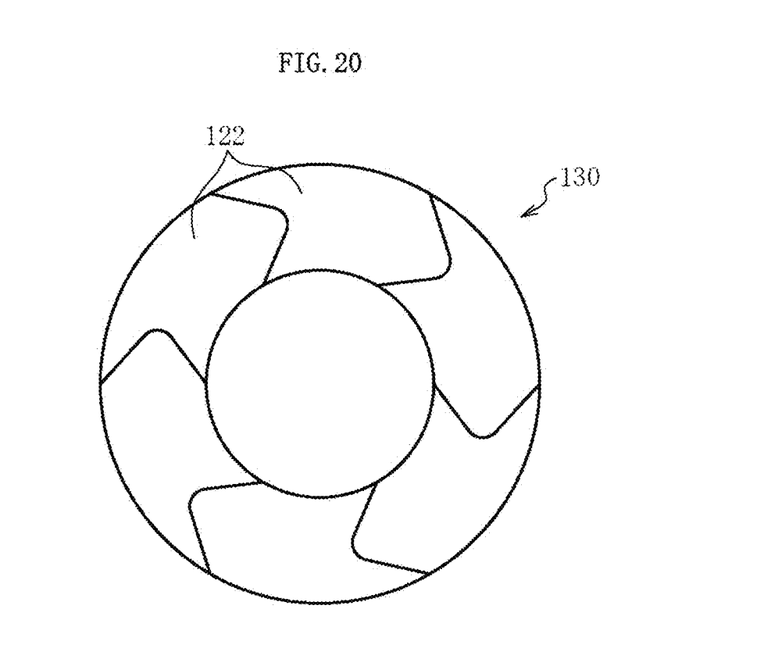
FIG. 20 is a front view for illustrating a state of forming the foils of FIG. 17 from a foil material.

However, when it is intended to reduce the floating gap h' of the thrust foil bearing 120 described above, the following problem arises. When the foils 122 are formed, as illustrated in FIG. 20, in general, a foil material 130 having a hollow disc shape is divided at a plurality of positions in a circumferential direction, and an entire region of the foil material 130 in the circumferential direction is used as the foils 122, thereby increasing a material yield. In this case, as illustrated in FIG. 17, an angle "A'" covering an arc portion 122c formed at a radially outer end of each of the foils 122 is equal to an angle "B" covering an arc portion 122d formed at a radially inner end of each of the foils 122. As a result, a circumferential length of the arc portion 122c at the radially outer end is larger than a circumferential length of the arc portion 122d at the radially inner end.

Figure 21:
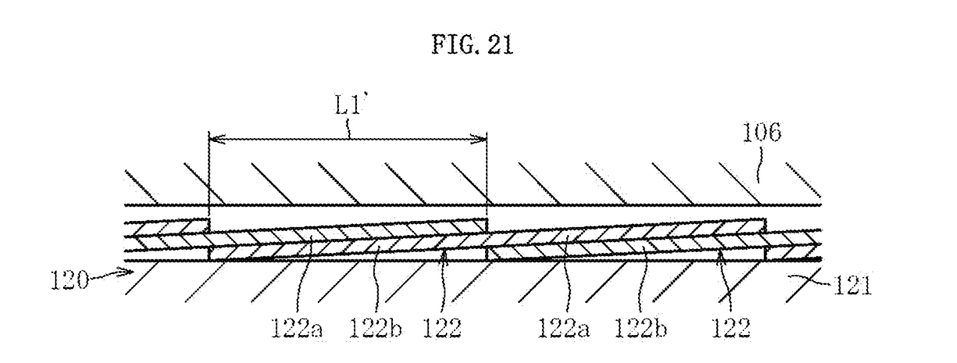
FIG. 21 is a sectional view taken along the line Y'-Y' of FIG. 16.
Figure 22:
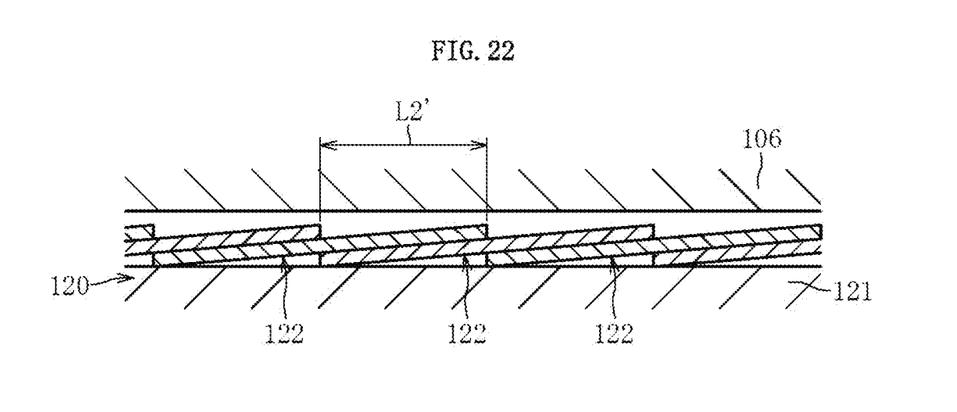
FIG. 22 is a sectional view taken along the line Z-Z of FIG. 16.

When the foils 122 are arranged so as to overlap each other while the phases of the foils 122 being shifted, at a near of the radially outer ends of the foils 122, as illustrated in FIG. 21, a circumferential pitch L1' between the foils 122 is relatively large. At a near of the radially inner ends of the foils 122, as illustrated in FIG. 22, a circumferential pitch L2' between the foils 122 is relatively small. As a result, rigidity near the radially inner end of each of the foils 122 is higher than rigidity near the radially outer end of each of the foils 122. Accordingly, each of the foils 122 is less likely to be bent, and thus easily comes into contact with the thrust collar. In this case, it is required that the floating gap be set with respect to the radially inner end of each of the foils as a reference. Accordingly, there has been a problem in that the floating gap cannot be reduced satisfactorily.

Therefore, the present invention has an object to increase a load capacity of a thrust foil bearing of a leaf type by reducing a floating gap.

Solution to Problem

In order to solve the above-mentioned problem, according to the present invention, there is provided a thrust foil bearing, comprising a plurality of foils each comprising a bearing surface arranged to be opposed to a rotary member in an axial direction, and being arrayed in a rotation direction of the rotary member, each of the plurality of foils comprising: a top foil portion comprising the bearing surface; and a back foil portion, which is formed on an upstream side of the top foil portion, and is arranged so as to overlap a side of the top foil portion of the adjacent foil opposite to the bearing surface, wherein an angle covering a radially inner end of an overlapping portion between the adjacent foils is smaller than an angle covering a radially outer end of the overlapping portion.

In the present invention, as described above, the angle covering the radially inner end of the overlapping portion between the adjacent foils (that is, region of the top foil portion of each of the foils to be supported by the back foil portion from behind (from a side opposite to the bearing surface)) is smaller than the angle covering the radially outer end of the overlapping portion. With this configuration, rigidity near the radially inner end of each of the foils is relatively low so that a difference between rigidity near the radially outer end of each of the foils and rigidity near the radially inner end of each of the foils is reduced. Thus, an entire surface of each of the foils can be bent substantially equally, thereby being capable of setting the floating gap to a smaller gap.

In the thrust foil bearing described above, for example, in each of the foils, the angle covering the radially inner end of a main body portion comprising the top foil portion and the back foil portion is smaller than the angle covering the radially outer end of the main body portion. With this configuration, the angle covering the radially inner end of the overlapping portion between the adjacent foils can be smaller than the angle covering the radially outer end of the overlapping portion.

Further, in the thrust foil bearing described above, it is preferred that the different between the angle covering the radially inner end of the overlapping portion between the adjacent foils and the angle covering the radially outer end of the overlapping portion be equal to or larger than 10°.

Advantageous Effects of Invention

As described above, according to the present invention, it is possible to increase a load capacity of the thrust foil bearing of a leaf type by reducing the floating gap.

DESCRIPTION OF EMBODIMENTS

Now, description is made of embodiment of the present invention with reference to the drawings.

Figure 1:
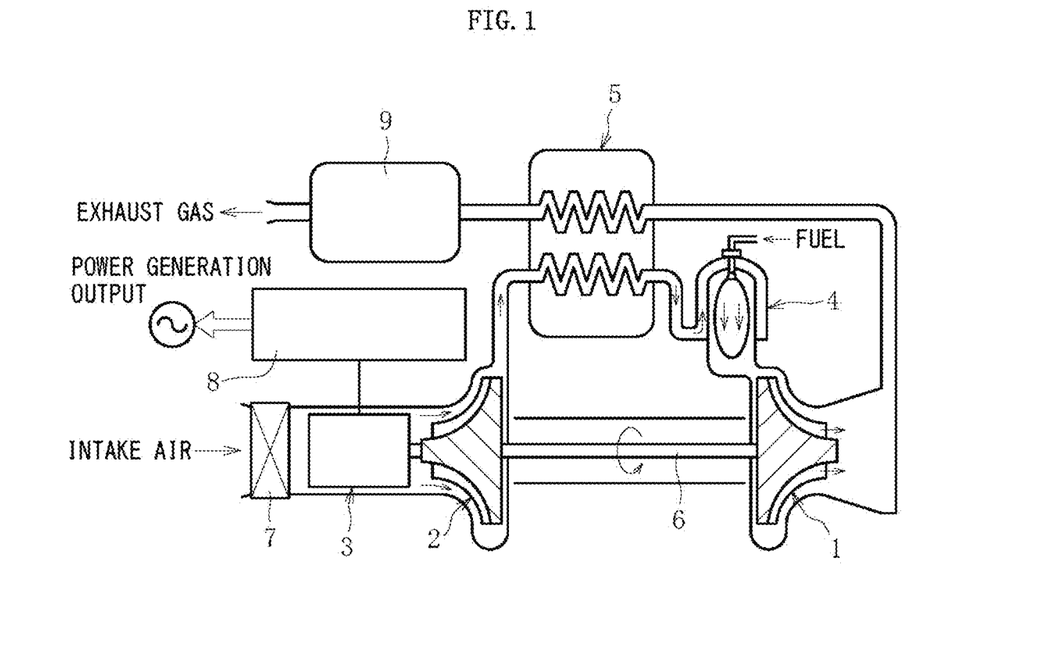
FIG. 1 is a schematic view for illustrating a gas turbine.

FIG. 1 is a schematic view for illustrating a configuration of a gas turbine as a type of a turbo machine. The gas turbine mainly comprises a turbine 1 and a compressor 2, which comprise blade cascades, a power generator 3, a combustor 4, and a regenerator 5. The turbine 1, the compressor 2, and the power generator 3 comprise a common main shaft 6 extending in a horizontal direction. The main shaft 6, the turbine 1, and the compressor 2 serve as an integrally rotatable rotor. Air sucked from an air-intake port 7 is compressed by the compressor 2, heated by the regenerator 5, and then fed into the combustor 4. The compressed air is mixed with fuel and combusted so as to rotate the turbine 1 with a high-temperature and high-pressure gas. A rotational force of the turbine 1 is transmitted to the power generator 3 through the main shaft 6 so as to rotate the power generator 3. Through the rotation of the power generator 3, electric power is generated and output through intermediation of an inverter 8. The gas having rotated the turbine 1 has a relatively high temperature. Thus, the gas is fed into the regenerator 5 so that heat exchange is performed with the compressed air prior to the combustion. Through the heat exchange, the heat of the gas after the combustion is reused. The gas that has been subjected to the heat exchange in the regenerator 5 passes through an exhaust heat recovery device 9, and then is exhausted as an exhaust gas.

Figure 2:
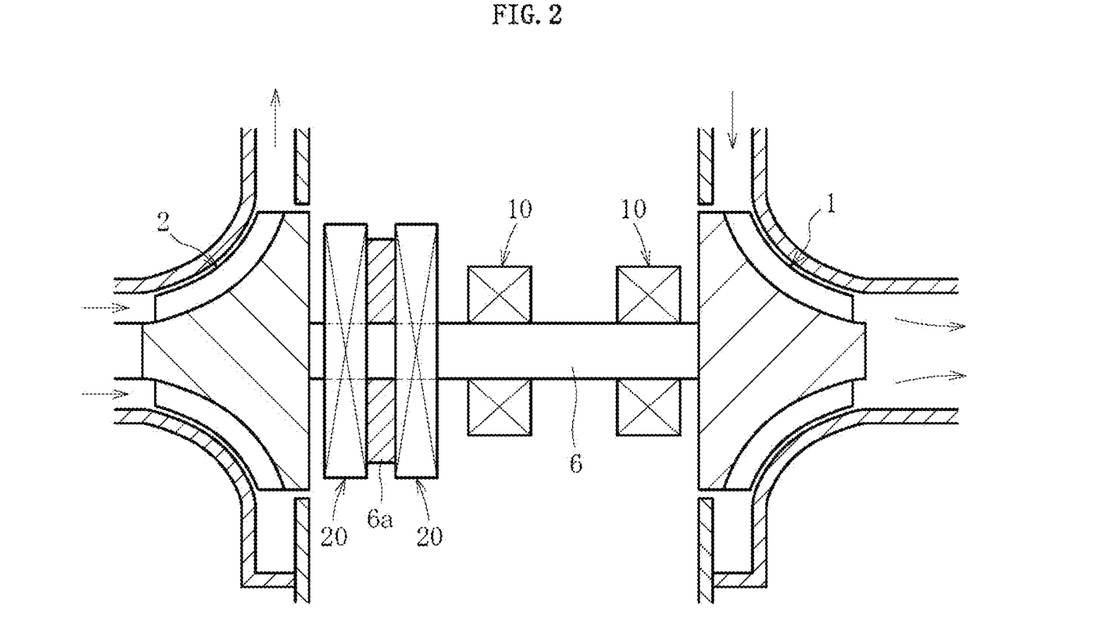
FIG. 2 is a sectional view for illustrating a support structure for a main shaft of the gas turbine.

FIG. 2 is an illustration of an example of a support structure for the rotor in the gas turbine described above. In the support structure, radial bearings 10 are arranged at two positions in an axial direction, and thrust bearings 20 and 20 are arranged on both sides in the axial direction of a thrust collar 6a provided on the main shaft 6. By the radial bearings 10 and the thrust bearings 20, the main shaft 6 is supported so as to be freely rotatable in a radial direction and both thrust directions.

In the support structure, an area between the turbine 1 and the compressor 2 is adjacent to the turbine 1 to be rotated with high-temperature and high-pressure gas, and hence has a high-temperature atmosphere. In the high-temperature atmosphere, lubricants formed of, for example, oil or grease are changed in quality and evaporated. Thus, it is difficult to apply a normal bearing (such as a rolling bearing) that uses the lubricants described above. Accordingly, as the bearings 10 and 20 to be used in the support structure of this type, an air fluid dynamic pressure bearing, in particular, a foil bearing is suitable.

Now, with reference to the drawings, description is made of a configuration of a foil bearing (hereinafter, referred to as "thrust foil bearing 20") suitable for the thrust bearing 20 for the gas turbine described above.

Figure 3:
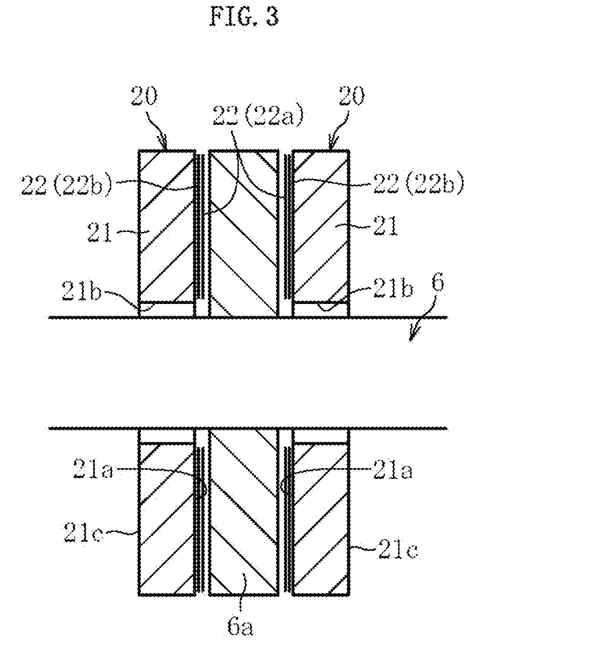
FIG. 3 is a sectional view for illustrating thrust foil bearings to be incorporated into the support structure.

As illustrated in FIG. 3, the thrust foil bearing 20 comprises a foil holder 21 having a disc shape, and a plurality of foils 22 mounted on an end surface 21a of the foil holder 21. In this embodiment, the thrust foil bearings 20 and 20 are provided on both sides of the thrust collar 6a in the axial direction. The thrust foil bearings 20 and 20 have structures symmetrical with respect to the thrust collar 6a in the axial direction. In the following, a downstream side in a flowing direction of a fluid with respect to the foils 22 during rotation of the main shaft 6 is referred to as "downstream side", and a side opposite thereto is referred to as "upstream side".

The foil holder 21 is made of, for example, metal or a resin. The foil holder 21 has a hollow disc shape having an inner hole 21b into which the main shaft 6 is to be inserted. The plurality of foils 22 are mounted on one end surface 21a of the foil holder 21. Another end surface 21c of the foil holder 21 is fixed to a housing of an apparatus (gas turbine in this embodiment) into which the thrust foil bearings 20 are to be incorporated.

The foils 22 are each made of metal having a rich spring property and gool workability, for example, made of steel or copper alloy. The foils 22 are each formed of a metal thin sheet (foil) having a thickness of from about 20 µm to about 200 µm. In the air fluid dynamic pressure bearing that uses the air as a fluid film as in this embodiment, there is no oil in the atmosphere. Thus, it is preferred that the foils 22 be each made of stainless steel or bronze.

Figure 4:
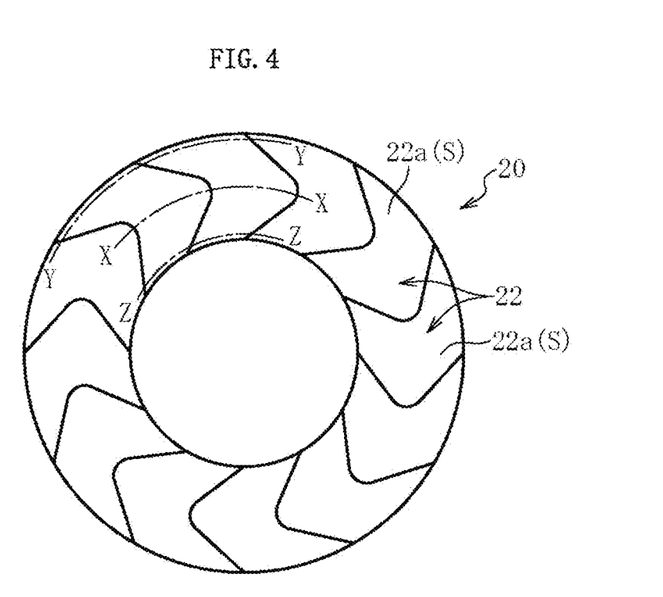
FIG. 4 is a front view for illustrating the thrust foil bearing as seen from an axial direction.
Figure 5:
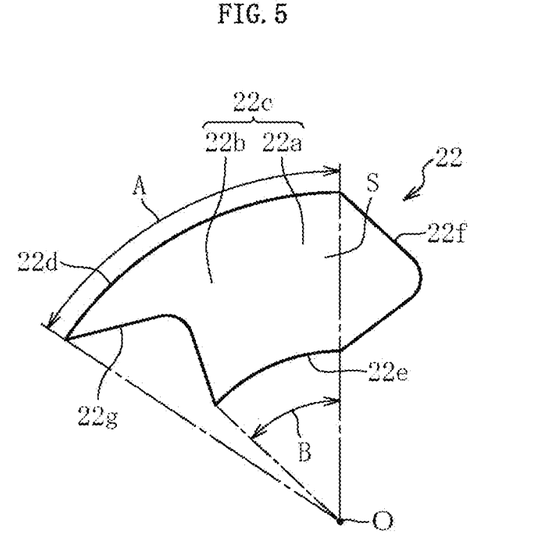
FIG. 5 is a front view for illustrating a foil of the thrust foil bearing.

As illustrated in FIG. 4, the foils 22 are arrayed in a circumferential direction while the phases of the foils 22 is shifted. As illustrated in FIG. 5, the foils 22 each comprise a main body portion 22c comprising a top foil portion 22a and a back foil portion 22b. The top foil portion 22a comprises a bearing surface S. The back foil portion 22b is formed so as to be continuous with an upstream side of the top foil portion 22a. In the illustrated example, a downstream-side end portion 22f (that is, a downstream-side end portion of the top foil portion 22a) and an upstream-side end portion 22g (that is, an upstream-side end portion of the back foil portion 22b) of the main body portion 22c each have such a herringbone shape that a middle portion thereof in a radial direction protrudes to the downstream side. In this embodiment, a shape of the downstream-side end portion 22f of the top foil portion 22a and a shape of the upstream-side end portion 22g of the back foil portion 22b are different from each other. Each of the foils 22 is fixed to the foil holder 21 by an appropriate method. For example, the upstream-side end portion 22g of the main body portion 22c is fixed to the end surface 21a of the foil holder 21 by welding.

An arc portion 22d is formed at a radially outer end of the main body portion 22c of the foil 22, and an arc portion 22e is formed at a radially inner end of the main body portion 22c. Both of a center of the arc portion 22d and a center of the arc portion 22e is the same with a rotation center O of the main shaft 6. An angle "B" covering the arc portion 22e at the radially inner end of the main body portion 22c is smaller than an angle "A" covering the arc portion 22d at the radially outer end of the main body portion 22c. For example, the angle "B" is smaller than the angle "A" by 10° or more. In the illustrated example, the radially outer end and the radially inner end of the downstream-side end portion 22f of the main body portion 22c are arranged with the same phase (circumferential positional phase), whereas the radially inner end of the upstream-side end portion 22g of the main body portion 22c is arranged more on the downstream side than the radially outer end of the upstream-side end portion 22g.

Figure 6:
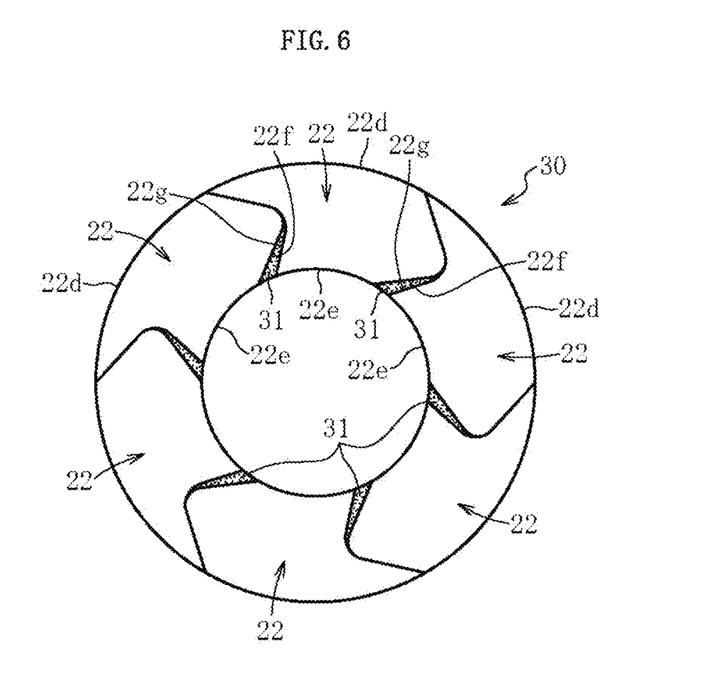
FIG. 6 is a front view for illustrating a state of forming the foils from a foil material.

The foils 22 are formed by performing punching or electric discharge machining on a foil material (metal thin sheet) having a flat sheet-like shape. In this embodiment, as illustrated in FIG. 6, six foils 22 are formed from a foil material 30 having a hollow disc shape. In this case, the radially outer end of the downstream-side end portion 22f and the radially outer end of the upstream-side end portion 22g of the adjacent foils 22 are held in contact with each other, whereas the radially inner end of the downstream-side end portion 22f and the radially inner end of the upstream-side end portion 22g of the adjacent foils 22 are apart from each other. In the illustrated example, the downstream-side end portion 22f and the upstream-side end portion 22g of the adjacent foils 22 are held in contact with each other in a region on a radially more outer side than a top portion of the main body portion 22c at the center thereof in the radial direction, but are apart from each other in a region on a radially more inner side than the top portion. In FIG. 6, of the foil material 30, each unnecessary portion 31 between the downstream-side end portion 22f and the upstream-side end portion 22g of the adjacent foils 22 is illustrated by the dotted pattern. In the illustrated example, the six foils 22 are formed from the foil material 30, and hence the angle "A" (see FIG. 5) covering the arc portion 22d at the radially outer end of each of the foils 22 is 60°. Meanwhile, the angle "B" covering the arc portion 22e at the radially inner end of each of the foils 22 is smaller than 60°, for example, equal to or smaller than 50°.

Figure 7:
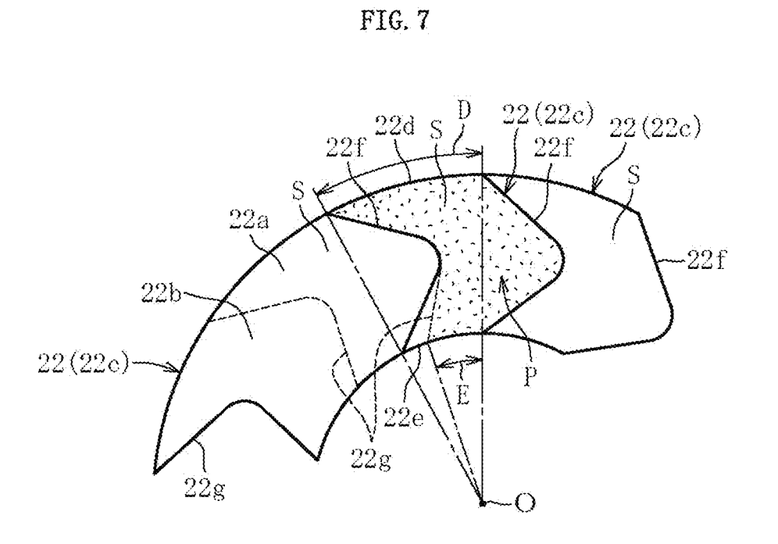
FIG. 7 is a front view for illustrating an overlapping state of the foils.
Figure 8:
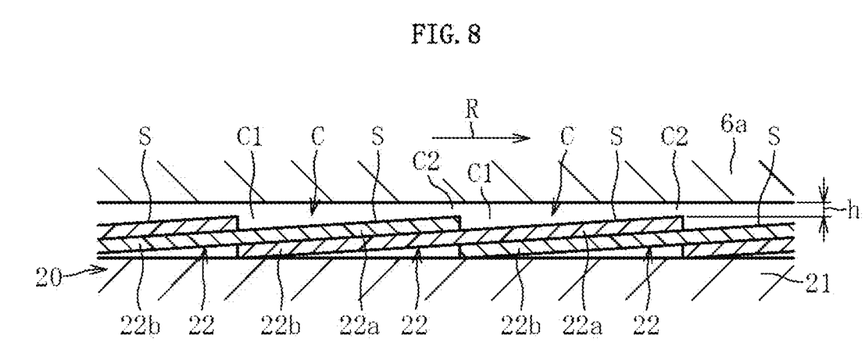
FIG. 8 is a sectional view taken along the line X-X of FIG. 4.

Under a state in which the foils 22 described above are mounted on the foil holder 21, as illustrated in FIG. 7 and FIG. 8, the bearing surface S formed on the top foil portion 22a of each of the foils 22 is opposed directly to the thrust collar 6a in the axial direction. Behind the top foil portion 22a of each of the foils 22 (on a side opposite to the bearing surface S), the back foil portion 22b of the foil 22 adjacent on the downstream side is arranged. That is, the back foil portion 22b of each of the foils 22 is arranged between the foil holder 21 and the top foil portion 22a of the foil 22 adjacent on the upstream side. In this embodiment, the angle "B" covering the arc portion 22e at the radially inner end of each of the foils 22 is smaller than the angle "A" covering the arc portion 22d at the radially outer end of each of the foils 22 (see FIG. 5). With this configuration, an angle "E" covering a radially inner end of an overlapping portion P (illustrated by the dotted pattern in FIG. 7) between the adjacent foils 22 is smaller than an angle "D" covering a radially outer end of the overlapping portion P. In the illustrated example, in each of the foils 22, the radially inner end and the radially outer end of the top foil portion 22a comprising the bearing surface S form the same angle, whereas an angle covering the radially inner end of the back foil portion 22b arranged behind the adjacent foil 22 is smaller than an angle covering the radially outer end of the back foil portion 22b.

When the main shaft 6 rotates to one side in the circumferential direction (direction indicated by the arrow R of FIG. 8), a bearing gap C is defined between the bearing surface S of each of the foils 22 of the thrust foil bearing 20 and the end surface of the thrust collar 6a. At this time, each of the foils 22 overlays on the adjacent foil 22 and curves so that the bearing gap C forms a wedge shape that becomes narrower toward the downstream side (in FIG. 8, each of the foils 22 is simplified and illustrated as a flat sheet). When the air in a large gap portion C1 of the wedge-shaped bearing gap C is pushed into a small gap portion C2, pressure of an air film in the bearing gap C is increased. With this pressure, the main shaft 6 is supported in the thrust direction in a non-contact manner. At this time, the foils 22 are elastically deformed in accordance with operating conditions such as a load, a rotation speed of the main shaft 6, and an ambient temperature. Thus, the bearing gap C is automatically adjusted so as to have appropriate widths in accordance with the operating conditions. As a result, even under severe conditions involving high temperature and high speed rotation, the bearing gap C may be managed so as to have optimum widths, and hence the main shaft 6 may be stably supported.

Figure 9:
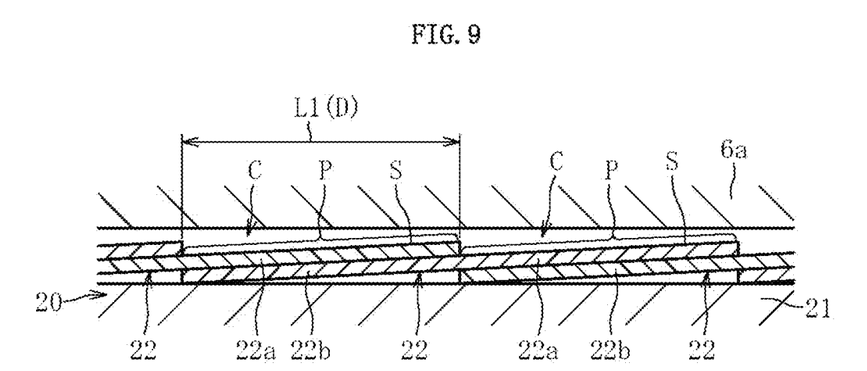
FIG. 9 is a sectional view taken along the line Y-Y of FIG. 4.
Figure 10:
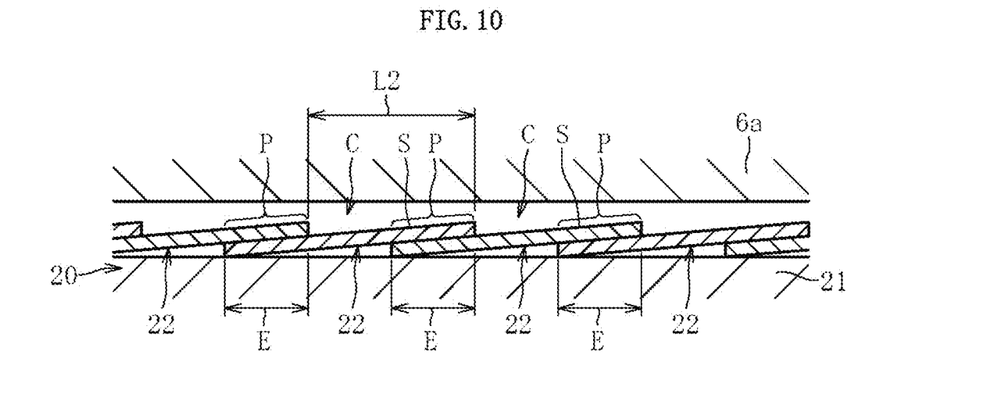
FIG. 10 is a sectional view taken along the line Z-Z of FIG. 4.

At this time, a circumferential pitch L1 (see FIG. 9) near the radially outer end of each of the foils 22 is smaller than a circumferential pitch L2 (see FIG. 10) near the radially inner end of each of the foils 22. Thus, at the near of the radially inner end of each of the foils 22, rigidity of the bearing surface S is more likely to be higher than that near the radially outer end (that is, the bearing surface S is less liable to be displaced in the axial direction).

In the present invention, as described above, the angle "B" covering the arc portion 22e at the radially inner end of each of the foils 22 is smaller than the angle "A" covering the arc portion 22d at the radially outer end. With this configuration, the angle "E" covering the radially inner end of the overlapping portion P between the adjacent foils 22 is smaller than the angle "D" covering the radially outer end of the overlapping portion P. That is, near the radially outer ends of the foils 22, the overlapping portions P between the adjacent foils 22 are arranged continuously with each other in the circumferential direction (see FIG. 9). In contrast, at the near of the radially inner ends of the foils 22, the overlapping portions P between the adjacent foils 22 are arranged apart from each other in the circumferential direction (see FIG. 10). As described above, at the near of the radially inner end of each of the foils 22, a ratio of a region of the top foil portion 22a to be supported by the back foil portion 22b is reduced so that the rigidity of the bearing surface S near the radially inner end of each of the foils 22 is reduced. As a result, a difference between the rigidity near the radially outer end of each of the foils 22 and the rigidity near the radially inner end thereof is reduced, thereby being capable of substantially equally bending an entire region of each of the foils 22 in the radial direction. Thus, a width (floating gap "h") of the small gap portion C2 of the bearing gap C can be further reduced, thereby being capable of increasing a load capacity of the thrust foil bearing 20.

Further, in this embodiment, the radially outer end and the radially inner end of the top foil portion 22a of each of the foils 22 form the same angle, whereas the angle covering the radially inner end of the back foil portion 22b of each of the foils 22 is smaller than the angle covering the radially outer end of the back foil portion 22b. In this case, as compared to the related-art foils 122 illustrated in FIG. 18, there is no difference in area of the top foil portion 22a, that is, an area of the bearing surface S. Accordingly, reduction in load capacity due to reduction in the area of the bearing surface S can be avoided.

During the low speed rotation immediately before the stop or immediately after the actuation of the main shaft 6, the bearing surfaces S of the foils 22 and the end surface of the thrust collar 6a come into sliding contact with each other. Thus, low-friction coating such as a DLC film, a titanium aluminum nitride film, a tungsten disulfide film, and a molybdenum disulfide film may be formed on one or both of the bearing surface S of each of the foils 22 and the end surface of the thrust collar 6a. Further, during the rotation of the main shaft 6, slight sliding is caused between the foils 22 and the foil holder 21, and between the top foil portion 22a and the back foil portion 22b of the overlapping foils 22. With frictional energy generated by the slight sliding, the vibration of the main shaft 6 can be damped. In order to adjust the frictional force generated by the slight sliding, the low-friction coating as described above may be formed on one or both of sliding surfaces.

Figure 11:
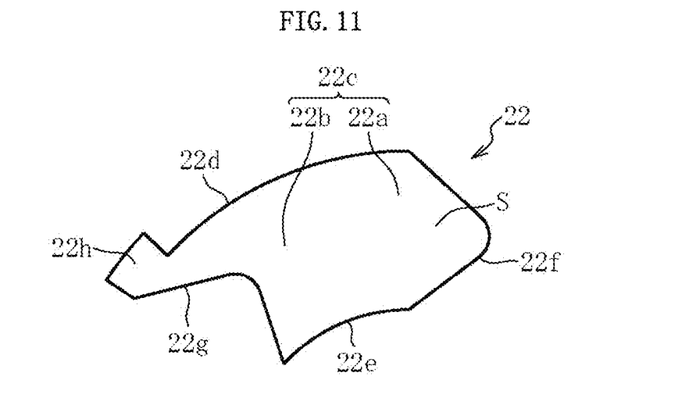
FIG. 11 is a front view for illustrating the foil in another embodiment.

The present invention is not limited to the embodiment described above. For example, in an embodiment illustrated in FIG. 11, the foil 22 comprises a fixing portion 22h extending from the main body portion 22c to a radially outer side. The fixing portion 22h is fixed to the foil holder 21 by an appropriate method such as welding, to thereby fix the foil 22 to the foil holder 21.

Figure 12:
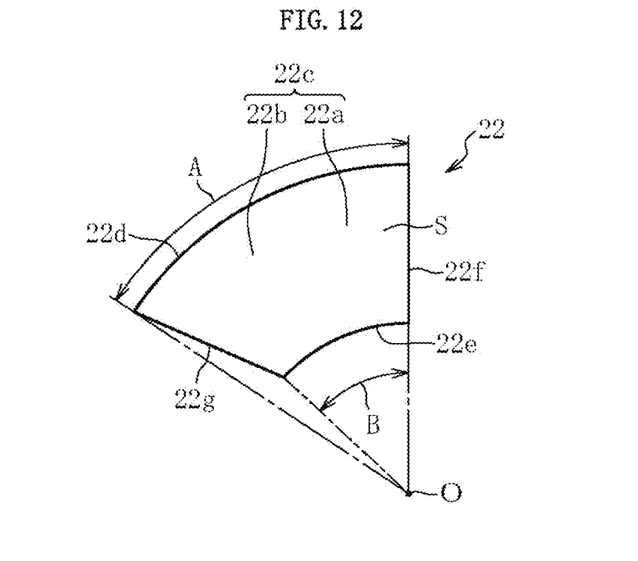
FIG. 12 is a front view for illustrating the foil in still another embodiment.

Further, in an embodiment illustrated in FIG. 12, the downstream-side end portion 22f and the upstream-side end portion 22g of the main body portion 22c of the foil 22 each have a straight shape. In the illustrated example, an entire region of the downstream-side end portion 22f is arranged with the same phase (circumferential positional phase), and the radially inner end of the upstream-side end portion 22g is arranged on the downstream side more than the radially outer end of the upstream-side end portion 22g. With this configuration, the angle "B" covering the radially inner end of the main body portion 22c is smaller than the angle "A" covering the radially outer end of the main body portion 22c.

The thrust foil bearing 20 as described above is applicable not only to the gas turbine, but also to other turbo machines such as a turbocharger, and can be used for other machines configured to support a rotary shaft.

EXAMPLES

Figure 13:
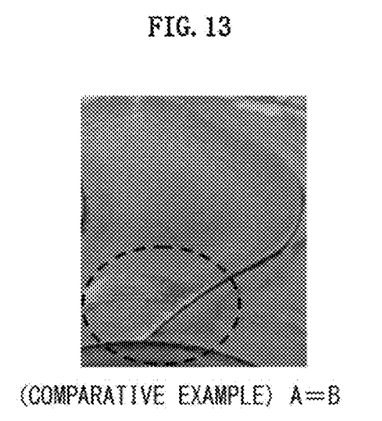
FIG. 13 is a photograph (front view) for showing a test result of a foil in Comparative Example.
Figure 14:
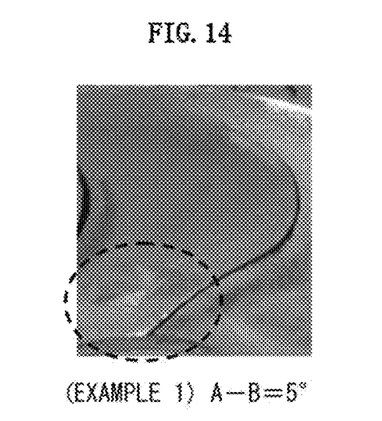
FIG. 14 is a photograph (front view) for showing a test result of a foil in Example 1.
Figure 15:
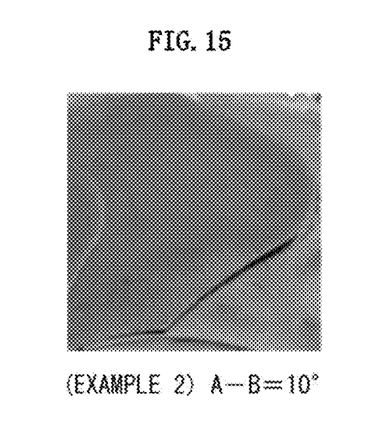
FIG. 15 is a photograph (front view) for showing a test result of a foil in Example 2.

In order to confirm effects of the present invention, there were prepared a foil (Comparative Example) having a difference of 0° between the angle "B" covering the radially inner end of the main body portion and the angle "A" covering the radially outer end of the main body portion, a foil (Example 1) having the difference of 5°, and a foil (Example 2) having the difference of 10°. After a raceway stopping test was performed on thrust foil bearings comprising those foils, states of the foils were observed. As a result, in Comparative Example, as shown in FIG. 13, at the near of the radially inner end of the top foil portion of each foil (in a region surrounded by the dotted line), there were marks made through sliding with the thrust collar. Meanwhile, in Example 1, as shown in FIG. 14, sliding marks on each foil was reduced as compared to those in Comparative Example. Further, in Example 2, as shown in FIG. 15, there were almost no sliding marks on each foil. Based on the results described above, it was confirmed that, when the angle "B" covering the radially inner end of each foil was smaller than the angle "A" covering the radially outer end of each foil, that is, when the angle covering the radially inner end of the overlapping portion between the adjacent foils was smaller than the angle covering the radially outer end of the overlapping portion, contact of each foil with the thrust collar at the radially inner end of the foil was reduced. In particular, in Example 2 having the difference of 10° between the angle "B" covering the radially inner end of each foil and the angle "A" covering the radially outer end of each foil, it is seen that an entirety of each of the foils is bent equally without involving contact of only the radially inner end of the foil with the thrust collar. When contact between the radially inner end of the foil and the thrust collar is thus suppressed, the bearing gap, in particular, the floating gap is further reduced, thereby being capable of increasing a load capacity.

REFERENCE SIGNS LIST 1 turbine
2 compressor
6 main shaft
6a thrust collar
10 radial bearing
20 thrust foil bearing
21 foil holder 22 foil
22a top foil portion
22b back foil portion
22c main body portion
22d arc portion (radially outer end)
22e arc portion (radially inner end)
22f downstream-side end portion
22g upstream-side end portion
30 foil material
31 unnecessary portion
C bearing gap
O rotation center
P overlapping portion between foils
S bearing surface

The invention claimed is:

1. A thrust foil bearing, comprising a plurality of foils each comprising a bearing surface arranged to be opposed to a rotary member in an axial direction, and being arrayed in a rotation direction of the rotary member,
   each of the plurality of foils comprising:
      a top foil portion comprising the bearing surface; and
      a back foil portion, which is formed on an upstream side of the top foil portion, and is arranged so as to overlap a side of the top foil portion of the adjacent foil opposite to the bearing surface,
   wherein an angle covering a radially inner end of an overlapping portion between the adjacent foils is smaller than an angle covering a radially outer end of the overlapping portion.

2. The thrust foil bearing according to claim 1, wherein in each of the foils, an angle covering a radially inner end of a main body portion comprising the top foil portion and the back foil portion is smaller than an angle covering a radially outer end of the main body portion.

3. The thrust foil bearing according to claim 1, wherein a difference between the angle covering the radially inner end of the overlapping portion and the angle covering the radially outer end of the overlapping portion is equal to or larger than 10°.

4. A foil bearing unit, comprising:
   the thrust foil bearing of claim 1; and
   the rotary member.

5. A turbo machine, comprising the foil bearing unit of claim 4.

6. A foil provided in a thrust foil bearing, the foil comprising a main body portion comprising:
   a top foil portion comprising a bearing surface arranged to be opposed to a rotary member in an axial direction; and
   a back foil portion, which is formed on an upstream side of the top foil portion, and is arranged so as to overlap a side of the top foil portion of the adjacent foil opposite to the bearing surface,
   wherein an angle covering a radially inner end of the main body portion is smaller than an angle covering a radially outer end of the main body portion.

* * * * *